United States Patent [19]

Michaux

[11] Patent Number: 4,479,658

[45] Date of Patent: Oct. 30, 1984

[54] WHEELBARROW WITH BRAKING SYSTEM

[76] Inventor: David Michaux, 401 Staircase, Lenoir, N.C. 28645

[21] Appl. No.: 385,280

[22] Filed: Jun. 4, 1982

[51] Int. Cl.$^3$ ................................................ B62B 1/18
[52] U.S. Cl. .................................. 280/47.31; 188/2 D
[58] Field of Search ..................... 188/24.11, 329, 332, 188/218 A, 18 R, 2 D; 280/47.31, 47.3

[56] References Cited

U.S. PATENT DOCUMENTS

| | | | |
|---|---|---|---|
| 1,565,614 | 12/1925 | Anibal | 188/18 R |
| 1,866,481 | 7/1932 | Norton | 188/329 |
| 2,004,740 | 6/1935 | Winkler | 188/18 R X |
| 2,095,039 | 10/1937 | Schmidt | 188/18 R |
| 2,171,186 | 8/1939 | Mead | 188/332 |
| 2,716,031 | 8/1955 | Roessler | 280/47.31 |
| 3,034,601 | 5/1962 | Felburn | 188/332 |
| 3,950,005 | 4/1976 | Patterson | 280/47.31 |
| 4,023,653 | 5/1977 | Yoshigai | 188/2 D X |

FOREIGN PATENT DOCUMENTS 1233619 10/1960 France ............................. 188/24.11

Primary Examiner—Joseph F. Peters, Jr.
Assistant Examiner—Michael Mar
Attorney, Agent, or Firm—Saidman, Sterne & Kessler

[57] ABSTRACT

The invention is a wheelbarrow which includes a hand-actuated braking system. The wheelbarrow comprises a frame, a wheel rotatably attached to the frame, a pan attached to the frame which contains the material to be transported, and a braking system which allows the user to manually apply a braking force to the wheel. The braking system employs a drum brake consisting of one or more brake shoes disposed within the hub of the wheel. A backplate encloses the brake mechanism within the hub to hinder foreign matter, such as water, mud, or oil from interposing itself between the brake shoe or shoes and the inner surface of the hub and interfering with the generation of the braking force. The braking system is actuated by means of a pivoted lever installed on the frame and linked to the brake by a flexible cable whose length can be adjusted. Legs can be attached to the bottom of the frame so that the wheelbarrow can stand unsupported in an upright position.

13 Claims, 5 Drawing Figures

WHEELBARROW WITH BRAKING SYSTEM

BACKGROUND OF THE INVENTION

I. Field of the Invention

The present invention relates to wheelbarrows. More particularly, it is directed toward a wheelbarrow with a manually actuated braking system.

II. Description of the Related Art

Wheelbarrows are commonly used to transport such materials as earth, sand, and cement. Such wheelbarrows are usually manually propelled. An operator must apply propulsive force to the frame of the wheelbarrow to set it in motion. To stop the wheelbarrow, he must apply a retrograde force to overcome the momentum of the wheelbarrow. Because a loaded wheelbarrow can have significant mass, it can acquire a considerable amount of momentum and can be difficult to stop. This task is even more difficult when the operator is guiding the wheelbarrow down an inclined plane, because the force of gravity tends to accelerate the wheelbarrow down the ramp. In such a situation, it is possible that the operator will be unable to exert sufficient retrograde force to brake the wheelbarrow. He could then lose control of the wheelbarrow. This is an extremely dangerous situation and can result in personal injury or property damage.

To enable an operator to stop a wheelbarrow or to prevent it from accelerating out of control, operator-actuated braking systems have been added to wheelbarrows. However, previously disclosed wheelbarrow braking systems have suffered from a significant disadvantage—the braking force is generated by frictional contact between a brake member such as a shoe and an exposed portion of the wheelbarrow's wheel or tire. Since wheelbarrows are most often used out of doors, water, mud, or oil can be splashed or carried up onto the outer surfaces of the wheel. If this happens, the effective coefficient of friction between the brake member and the tire or wheel will be significantly reduced, as will the braking force which can be generated.

This problem is inherent in the braking systems disclosed in U.S. Pat. Nos. 2,716,031 to Roessler and 3,950,005 to Patterson. The Roessler patent discloses a hand-operated brake for a wheelbarrow in which the braking force is generated by frictional contact between a brake shoe and the exposed, cylindrical rim of a wheel to which a tire is attached. The Patterson patent discloses a brake apparatus for a manually propelled, material-handling vehicle. The brake apparatus disclosed by Patterson develops braking force through the frictional engagement of a brake shoe with the periphery of a wheel or tire. An inspection of these patents readily reveals how the effectiveness of the braking systems they disclose will be quickly degraded in typical operating environments. It is very easy for foreign matter to become interposed between the brake member and the wheel and thus interfere with the generation of the required braking force.

OBJECTS AND SUMMARY OF THE INVENTION

In light of the above-noted deficiency of the previous wheelbarrows equipped with braking systems, it is a primary object of the present invention to provide a wheelbarrow with a manually actuated braking system whose performance is not easily degraded in typical operating environments by the migration of such commonplace foreign matter as water or mud.

Another object of the invention is to provide a wheelbarrow with a braking system which is dependable, easy to use, and easy to adjust for the generation of the proper braking force.

These and other objects are achieved in the preferred embodiment set forth herein, which is a wheelbarrow with a braking system, comprising a frame, a wheel rotatably attached to and supporting the frame, a material-containing pan attached to the frame, and a hand-actuated brake which is enclosed within the hub of the wheel to isolate it from foreign matter and from the elements.

The brake is actuated by applying force to a lever which is pivotally attached to the frame, and which is linked to the braking mechanism by a flexible cable having an outer sheath and an inner cable member. Means are included for adjusting the length of the cable, including ferrules which are attached to each end of the sheath and which mate with threaded studs on retaining brackets, and a bolt which attaches one end of the inner cable member to an arm which drives a cam. The cam brings the brake into frictional contact or braking engagement with the inner surface of the hub of the wheel. The brake is normally biased away from contact with the inner surface of the hub by a spring. Braking action is initiated when the operator applies a sufficient force to the pivoted lever (which force is transmitted by the cable) to cause the arm-driven cam to overcome the biasing force of the spring acting upon the brake.

Also, the preferred embodiment includes handles attached to the ends of the frame, and legs attached to the bottom of the frame which allow the wheelbarrow to stand unassisted in an upright position.

BRIEF DESCRIPTION OF THE DRAWINGS

Some of the objects of the invention have been set forth above. These and other objects and advantages will appear more clearly as the detailed description of the invention proceeds when considered in connection with the accompanying drawings, in which.

DETAILED DESCRIPTION OF THE PREFERRED EMBODIMENT

Figure 1:
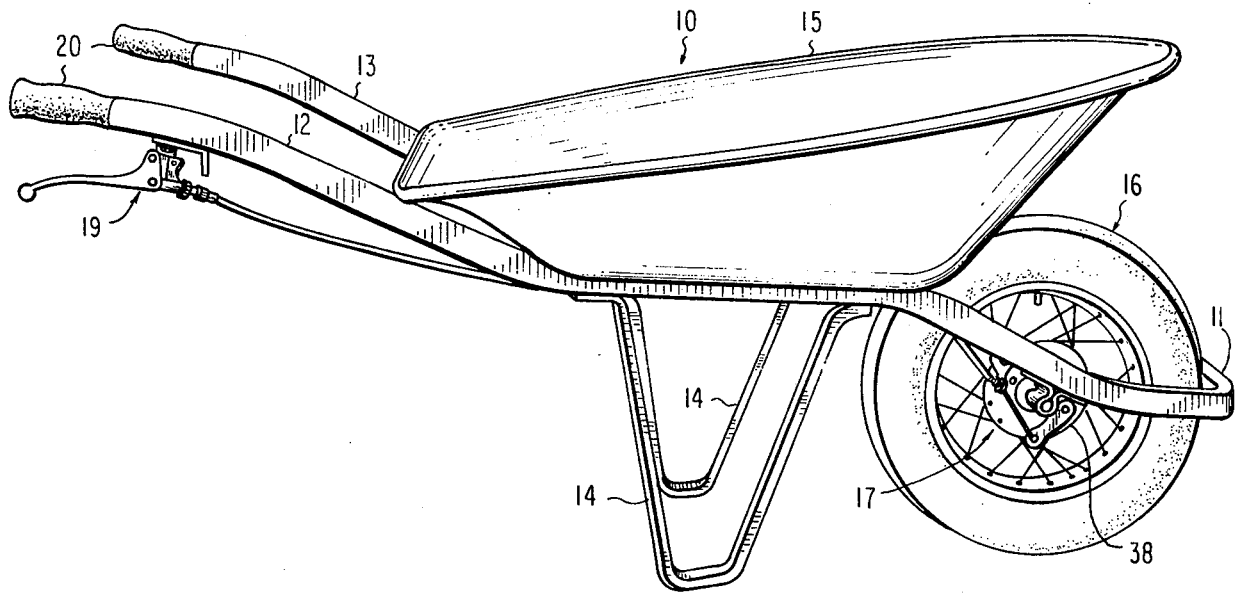
FIG. 1 is a side, perspective view which illustrates a preferred embodiment of the present invention.
Figure 2:
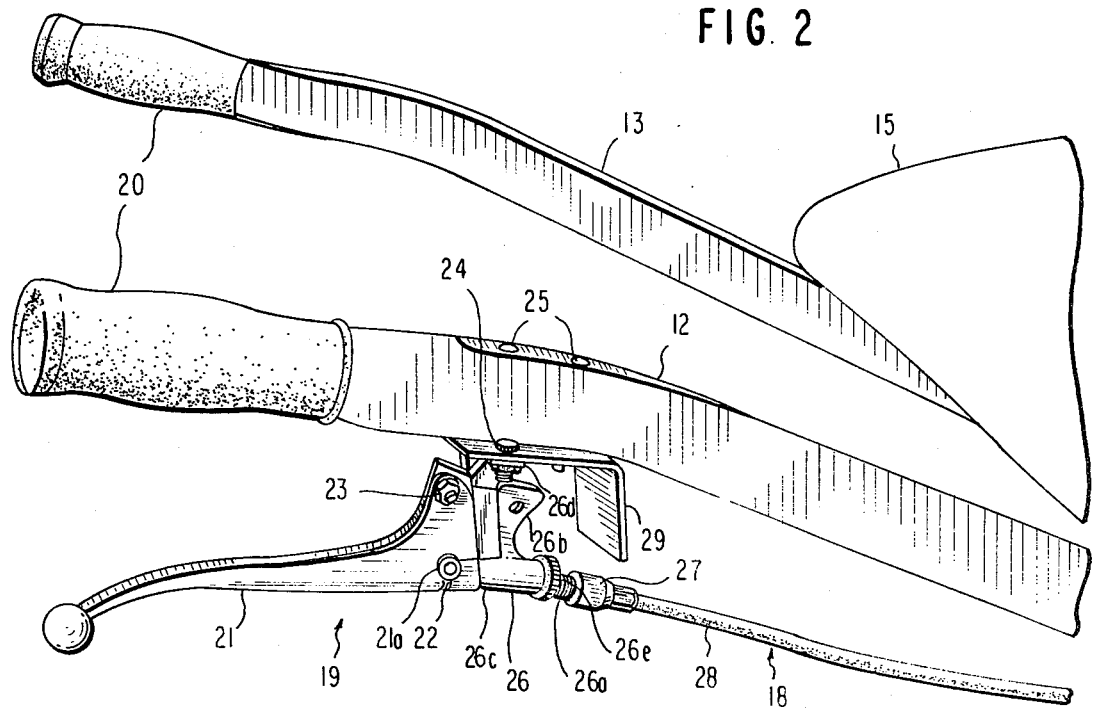
FIG. 2 is an enlarged, fragmentary perspective view of the rear portion of the preferred embodiment shown in FIG. 1, which shows details of the brake-actuating means.

Referring now to the drawings, in which the same reference numeral indicates identical or corresponding parts throughout the several views, and more particularly to FIG. 1, the preferred embodiment of the wheelbarrow of the present invention is generally indicated at 10. Wheelbarrow 10 has a frame 11, which comprises a pair of laterally spaced, diverging frame members 12 and 13. Attached to the bottom of frame members 12 and 13 are a pair of legs 14, which allow the wheelbarrow to stand unassisted in an upright position. Also attached to frame members 12 and 13 is a pan 15, which contains the material to be transported, and a wheel shown generally at 16, which bears the load of the wheelbarrow when it is in use. Wheel 16 is attached to frame members 12 and 13 near their convergent ends, where they are attached to each other. The divergent ends of frame members 12 and 13 are preferably terminated with a pair of respective handles 20.

The structure which has been described to this point is standard and well known in the wheelbarrow art. The braking system for the wheelbarrow of the present invention includes three major components: a brake shown generally at 17 and installed in proximity to the hub 38 of wheel 16; an actuator shown generally at 19 which is pivotally attached to frame member 12 near its divergent end; and a flexible cable 18, which is attached at one end to brake 17 and at the other end to actuator 19, and which transmits applied force from actuator 19 to brake 17.

Referring now to FIGS. 2 through 5, it can be seen that actuator 19 comprises a lever 21, which is pivotally attached to a coupling member 26 by means of a fastener 23, and which extends substantially parallel to the divergent end of frame member 12. Coupling member 26 comprises a hollow, cylindrical section 26c, a tangential projection 26b, and a hollow, threaded stud 26a, whose major axis is substantially collinear with the major axis of hollow cylindrical body 26c. Tangential projection 26b merges at one end with the outer surface of cylindrical body 26c and is terminated at its other end with at least one flange 26d which extends perpendicularly from the major axis of tangential projection 26b. Coupling member 26 at its flange 26d is attached to a bracket 29 by means of another fastener 24 which extends through bracket 29 and flange 26d. Flange 29 is attached to frame member 12 near its divergent end by means of other fasteners 25.

Level 21 has, near its privoted end, a substantially circular notch 21a, within which is disposed a pin 22, which terminates one end of an inner cable member 31 of cable 18. Cable 18 also has an outer sheath 28, which is terminated at one end with a ferrule 27, which engages threaded stud 26a. Ferrule 27 is held in its proper position on threaded stud 26a by a locknut 26e.

Figure 3:
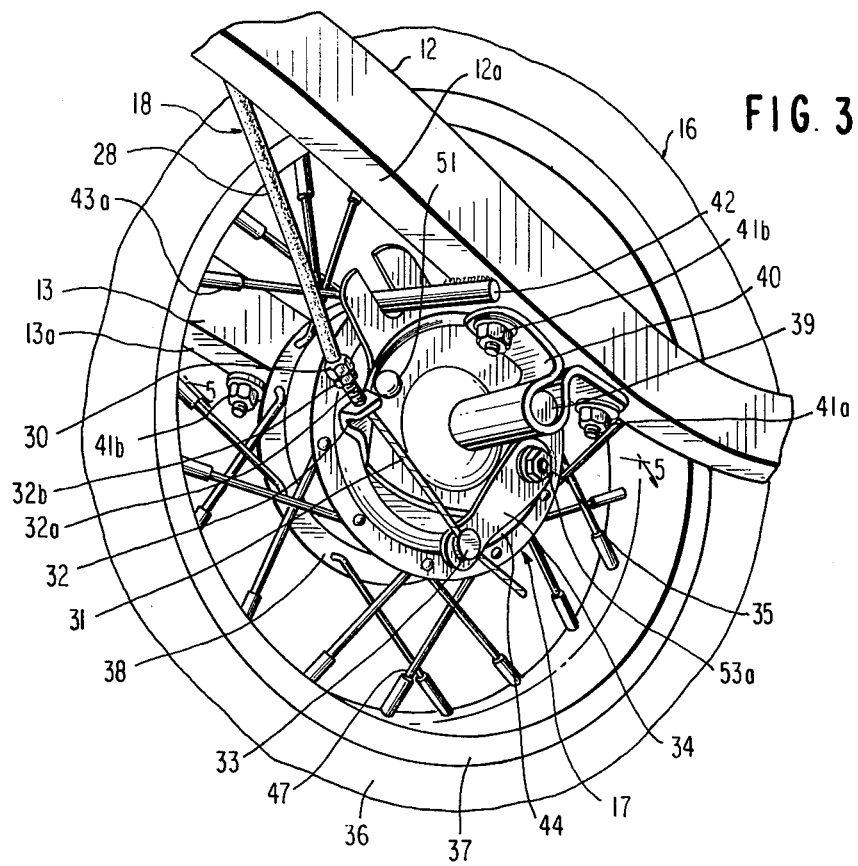
FIG. 3 is an enlarged, fragmentary prespective view of a front portion of the preferred embodiment shown in FIG. 1, which shows details of the wheel and the brake.
Figure 4:
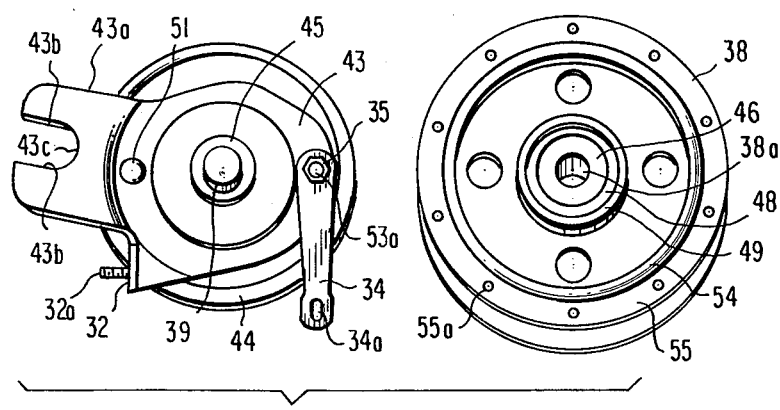
FIG. 4 are enlarged, fragmentary side views of the wheel hub and the means by which the brake is enclosed within the wheel hub and actuated.

The remaining end of outer sheath 28 is terminated by another ferrule 30 (see FIG. 3). This latter ferrule engages another hollow, threaded stud 32a, which is part of a bracket 32 which extends from the periphery of a quasicircular plate 43. Ferrule 30 is held in its proper position on threaded stud 32a by another locknut 32b. Also extending from the periphery of plate 43 is a notched tab 43a (see FIG. 4), whose notch is defined by a pair of parallel, substantially straight and inwardly extending sides 43b, which are joined by a substantially semicircular side 43c. Plate 43 abuts and is attached to a backplate 44 by means of a pivot pin 51, an annular, concentric member 45 of an axle 39, and a nut 35, which engages a threaded stud 53a of a cam 53. Nut 35 also rotatably secures an arm 34 to the plate. The remaining end of inner cable member 31 passes through sheath 28, threaded stud 32a, and bracket 32, and is attached to arm 34 by means of another fastener 33, which passes through a hole 34a at the end of arm 34 opposite that which is pivotally secured by nut 35 and threaded stud 53a of cam 53. Axle 39 extends perpendicularly through the centers of plate 43 and backplate 44. On opposing sides of axle 39 are pin 51 and nut 35.

Figure 5:
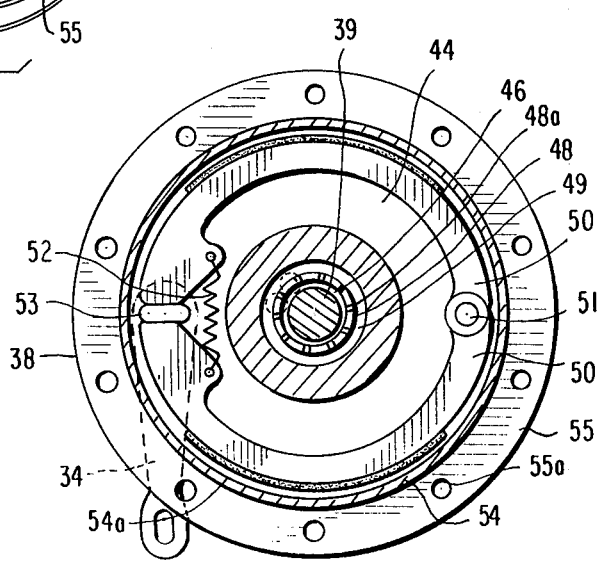
FIG. 5 is an enlarged, cross-sectional view taken substantially along line 5—5 of FIG. 3 which shows the brake disposed within the wheel hub.

To the side of backplate 44 opposite that to which plate 43 is attached, a pair of brake shoes 50 are mounted (see FIG. 5). Brake shoes 50 are roughly semicircular in shape and at one of their ends are pivotally attached to each other and to the plate and backplate by means of pivot pin 51. At their other ends, brake shoes 50 are biased toward each other and into contact with cam 53 by means of a spring 52, which is attached to and which extends between the opposing brake shoes 50. The assembly comprising arm 34, nut 35, plate 43, backplate 44, brake shoes 50, pivot pin 51, spring 52, and cam 53 is disposed within hollow, cylindrical hub 38 of wheel 16.

Axle 39 is journaled about the center of hub 38 by means of a set of bearings 48a, which are contained in a bearing race 48, which is defined by concentric, inner and outer annular members 46 and 49. An inner wall or surface 54a of an annular hub member 54 surrounds the outer surfaces of brake shoes 50 such that hub 38 functions as a brake drum. Annular hub member 54 is concentric with and extends perpendicularly from one face of hub plate 55. Disposed circumferentially near the outer edge of hub plate 55 are a series of holes 55a, which are engaged by one end of each of a set of spokes 47. The other ends of spokes 47 are rigidly attached to a rim 37 of wheel 16. A pneumatic tire 36 is preferably attached to rim 37. Each end of axle 39 is retained by an omega-shaped bracket 40, which is fastened to the bottom surface 12a or 13a of respective frame member 12 or 13 by means of nuts and bolts 41a and 41b. A cylindrical rod 42 is attached by welding or other suitable means to bottom surface 12a of frame member 12 between the points on frame member 12 to which pan 15 and nut and bolt 41b are attached. Cylindrical rod 42 is attached to bottom surface 12a of frame member 12 near the point of attachment of nut and bolt 41b such that it extends perpendicularly with respect to the major axis of frame member 12 toward frame member 13 so that it engages the notch defined by sides 43b and 43c in tab 43a of plate 43.

In operation, the load of wheelbarrow 10 is transmitted by a frame members 12 and 13, axle 39, hub 38, spokes 47, rim 37, and tire 36 to the surface which supports tire 36. Spring 52 normally biases brake shoes 50 away from contact with inner wall or surface 54a of annular hub member 54 so that wheel 16 can rotate freely. When the operator applies force to lever 21, the lever pivots and causes displacement of pin 22 and inner cable member 31. The displacement of inner cable 31 causes a pivoting of arm 34, which results in angular displacement of cam 53. Thus, the force applied to lever 21 is transmitted via cable 18, arm 34, and cam 53 to brake shoes 50. If the applied force is sufficiently large, the biasing force of spring 52 is overcome, and cam 53 urges brake shoes 50 into frictional contact with the inner wall or surface 54a of annular hub member 54. The resulting frictional force tends to decelerate wheelbarrow 10. The engagement of rod 42 by surfaces 43b and 43c of notched tab 43a prevents axle, plate 43, and backplate 44 from pivoting when the pressure exerted on lever 21 is transmitted via inner cable member 31 to pivoted arm 34.

Backplate 44 and hub 38 form an enclosure for brake shoes 50 which advantageously hinders the migration of such foreign matter as water or mud into the space between brake shoes 50 and inner wall or surface 54a of annular hub member 54. The presence of such foreign matter would interfere with the generation of the braking force by the frictional engagement of brake shoes 50 and the inner wall or surface 54a of annular hub member 54. Thus, brake 17 tends to retain its effectiveness, even when wheelbarrow 10 is used on a wet, muddy or oily surface.

Obviously, many modifications and variations of the present invention are possible in light of the above teachings. It is therefore to be understood that within the scope of the claims which follow, the invention may be practiced otherwise than as specifically described therein.

I claim:

1. A wheelbarrow, which comprises:
   (a) a frame;
   (b) a pan attached to the frame;
   (c) a wheel, rotatably mounted to the frame, which includes a hub;
   (d) a brake disposed within the hub;
   (e) means comprising a backplate abutting the hub for enclosing the brake within the hub to hinder the entry of foreign matter;
   (f) actuator means linked to the brake for bringing the brake into contact with the hub;
   (g) a plate attached to the backplate and having a notched tab;
   (h) an axle attached to and extending through the plate and the backplate, first and second brackets securing the axle to the frame, the hub being journaled about the axle;
   (i) wherein the actuator means comprises:
      (f1) a third bracket, attached to the frame, having a threaded stud and a hole extending longitudinally therethrough;
      (f2) a lever pivotally attached to the third bracket;
      (f3) a cam abutting the brake;
      (f4) an arm attached to the cam and pivotally attached to and passing through the backplate and the plate;
      (f5) a fourth bracket attached to the plate having a threaded stud and a hole extending longitudinally therethrough; and
      (f6) a flexible cable having a sheath and an inner cable member, the sheath attached at its first end to the threaded stud of the third bracket and at its second end to the threaded stud of the fourth bracket, the inner cable member passing through the threaded stud of the third bracket, through the sheath, and through the threaded stud of the fourth bracket, and attached at its first end to the lever and attached at its second end to the arm; and
   (j) a rod attached to the frame and engaging the notched tab of the plate to prevent the plate and the backplate from rotating when pressure applied to the lever is transmitted by the inner cable member to the arm.

2. A wheelbarrow as recited in claim 1, further comprising means for adjusting the length of the cable.

3. A wheelbarrow as recited in claim 1, further including a spring attached to the brake to bias the brake away from the hub.

4. A wheelbarrow as recited in claim 1, in which the wheel further includes a rim rigidly attached to the hub and a pneumatic tire attached to the rim.

5. A wheelbarrow as recited in claim 1, wherein the brake comprises two brake shoes pivotally attached at their first ends to the backplate and the plate, abutting the cam at their second ends, and disposed within the hub for braking engagement therewith.

6. A wheelbarrow as recited in claim 5, wherein a spring is attached to the two brake shoes near their second ends to bias the two brake shoes away from the hub.

7. A wheelbarrow, which comprises:
   (a) a frame having two longitudinally extending frame members arranged in a converging relationship, attached to each other at their convergent ends, and terminated at their divergent ends;
   (b) a pan rigidly attached to the frame;
   (c) first and second brackets attached to the frame members between their convergent ends and the pan;
   (d) an axle secured at its ends to the first and second brackets and extending between the frame members;
   (e) a wheel, journaled on the axle, including a hub having inner and outer surfaces, a rim rigidly attached to the hub, and a pneumatic tire attached to the rim;
   (f) a brake, mounted within the inner surface of the hub, which includes a brake shoe positioned adjacent to the inner surface of the hub for braking engagement therewith;
   (g) a lever pivotally mounted to one of the frame members between its divergent end and the pan;
   (h) a flexible cable linking the brake and the lever;
   (i) a backplate abutting the hub to hinder foreign matter from migrating into the hub and interfering with the braking engagement of the brake shoe and the inner surface of the hub;
   (j) a rod attached to one of the frame members between the pan and the respective bracket attached to said one frame member;
   (k) a plate attached to the backplate and having a notched tab which engages the rod to prevent the plate, the backplate and the brake shoe from rotating when pressure is applied to the lever; and
   (l) a third and a fourth bracket attached to the frame and the plate respectively, each bracket having means for mounting said cable comprising a threaded stud and a hole extending longitudinally therethrough.

8. A wheelbarrow as recited in claim 7, further comprising a cam which engages one end of the brake shoe and which is rotatably attached to the backplate, an arm attached to the cam and to the cable, which cam brings the brake shoes into braking engagement with the inner surface of the hub when pressure is applied to the lever.

9. A wheelbarrow as recited in claim 8, further comprising a spring attached to the brake shoe near said one end, and wherein the brake shoe is at its other end pivotally attached to the backplate.

10. A wheelbarrow as recited in claim 7, wherein the brake further includes a second brake shoe engaged at one end by the cam, pivotally attached at its other end to the backplate and which is positioned adjacent the inner surface of the hub for braking engagement therewith.

11. A wheelbarrow as recited in claim 10, wherein the spring is attached to the two brake shoes near those ends of the shoes which are engaged by the cam.

12. A wheelbarrow as recited in claim 11, further comprising handles that are attached to the divergent ends of the frame members.

13. A wheelbarrow as recited in claim 12, further comprising two legs attached to the frame members below the pan which allow the wheelbarrow to stand unassisted in an upright position.

* * * * *